United States Patent [19]

Zittel

[11] Patent Number: 5,752,431
[45] Date of Patent: May 19, 1998

[54] BLANCHER WITH MULTIPLE COOLING ZONES

[76] Inventor: David R. Zittel, 155 Oak Grove Dr., Columbus, Wis. 53925

[21] Appl. No.: 730,717

[22] Filed: Oct. 15, 1996

[51] Int. Cl.$^6$ .............. A23L 3/00; A23N 12/00; A47J 37/12; F25D 25/02
[52] U.S. Cl. .............. 99/348; 99/355; 99/404; 99/409; 99/443 C; 99/470; 99/517; 134/65; 134/132
[58] Field of Search .............. 99/348, 352–355, 99/360, 365, 403, 404, 409, 450, 470, 483, 487, 516, 517, 534, 536, 477–479, 443 R, 443 C; 366/81, 91, 101, 102, 144, 234, 290, 318, 319, 322, 324; 134/65, 132; 62/381; 100/117, 145

[56] References Cited

U.S. PATENT DOCUMENTS

| | | | |
|---|---|---|---|
| 1,231,002 | 6/1917 | Steere | 134/132 |
| 1,290,396 | 1/1919 | Steere | 134/132 |
| 1,806,957 | 5/1931 | Stocking | 134/132 |
| 2,166,197 | 7/1939 | Schaub | 366/322 |
| 2,314,871 | 3/1943 | DeBack | 134/65 |
| 2,909,872 | 10/1959 | Kearney et al. | 134/132 |
| 3,135,668 | 6/1964 | Wesson | 134/132 |
| 3,484,360 | 12/1969 | Sandrock | 366/234 |
| 3,760,714 | 9/1973 | Lortz | 99/404 |
| 4,410,553 | 10/1983 | McGinty | 99/348 |
| 4,688,476 | 8/1987 | Zittel | 99/403 |
| 4,875,344 | 10/1989 | Zittel | 62/381 |
| 4,906,104 | 3/1990 | Nishise et al. | 366/322 |
| 4,942,810 | 7/1990 | Zittel | 99/477 |
| 5,146,841 | 9/1992 | Zittel | 99/348 |
| 5,327,817 | 7/1994 | Zittel | 99/348 |
| 5,329,842 | 7/1994 | Zittel | 99/348 |
| 5,341,729 | 8/1994 | Zittel | 99/348 |
| 5,427,015 | 6/1995 | Zittel | 99/348 |
| 5,429,041 | 7/1995 | Zittel | 99/348 |
| 5,456,091 | 10/1995 | Zittel | 62/375 |

*Primary Examiner*—Timothy F. Simone
*Attorney, Agent, or Firm*—Nilles & Nilles, S.C.

[57] ABSTRACT

A blancher having multiple cooling zones formed by a tank having multiple compartments for receiving a heating liquid in one compartment and a coolant in at least two other compartments. In a preferred embodiment, the tank has a sidewall with an end wall at its inlet end, an end wall at its discharge end, and a pair of dividing baffles which separate the tank into compartments. Received within the tank is a food transport mechanism that preferably is a helical auger having a portion in each compartment to urge food product toward the discharge end. Preferably, a liquid hot enough to cook or blanch food product is received in the inlet end compartment and a liquid cold enough to cool the food product is received in the discharge end compartment. To precool the food product after it has been heated, a precooling liquid preferably is received in a compartment between the inlet end and outlet end compartments. Preferably, water at a temperature of between 55° Fahrenheit and 75° Fahrenheit is received in the precooling compartment and water at a temperature of between 32° Fahrenheit and 55° Fahrenheit is received in the cooling compartment. Preferably, each of the cooling compartments can be constructed having cooling water inlets and outlets that produce a coolant flow opposite the direction of food product flow creating a counterflow heat exchanging arrangement. Preferably, at least some of the coolant supplied to the precooling compartment is well or ground water for saving energy and money.

54 Claims, 6 Drawing Sheets

BLANCHER WITH MULTIPLE COOLING ZONES

FIELD OF THE INVENTION

The present invention relates to industrial food processing equipment in general and more particularly to an apparatus for heating and cooling food products by being received in a bath of liquid.

BACKGROUND OF THE INVENTION

In mass processing food product, food product is often heated by cooking or blanching it in a blanching food processing apparatus having a tank holding a hot liquid bath into which the food product is immersed. After cooking or blanching has taken place, the food product is cooled or chilled by immersing it in a bath of colder liquid so it can be packaged, stored and/or shipped. However, if the food product is cooled too quickly, it can crack, fracture or otherwise be damaged. As a result, cooling damage can lead to expensive product loss during quality control inspections or, even worse, can cause loss of business if damaged food product is returned by a distributor or food retailer.

Therefore, to avoid damaging food product after it has been cooked or blanched, the food product must be cooled in a carefully controlled manner. In the past, heating and cooling of food product has been done using separate blanching and cooling units connected by a conveyor or another food transport mechanism that transports the food product from a blancher to a cooling unit, commonly a chiller or the like. While stand alone heating and cooling units have enjoyed and continue to enjoy commercial success, separate heating and cooling units, along with the conveyor, take up a considerable amount of valuable and expensive floor space in the food processing plant. Moreover, valuable food processing time can be wasted transporting food product from the heating unit to a cooling unit.

A remedy to these problems is found in Zittel, U.S. Pat. No. 5,329,842, which discloses a single food processing apparatus having a blanching compartment that communicates food product to an immediately adjacent cooling compartment. While this combination blancher and cooler has enjoyed and continues to enjoy substantial commercial success, improvements nonetheless remain.

For example, it has been found that a single stage of cooling may not be adequate for all for all food processing applications. Where food product is particularly sensitive to damage by being cooled too quickly, precooling before final cooling or chilling has been found to minimize and substantially prevent food product damage. Additionally, by cooling in stages, cooling is done more gradually and more control over the processing of the food product is desirably obtained.

Another challenge has been to economically produce the rather large volumes of cooled and chilled liquid necessary to cool large amounts of food down to a certain desired temperature or within a range of temperatures. For example, to cool mass quantities of food product that have been blanched at a temperature of between about 160° Fahrenheit and 210° Fahrenheit down to a temperature of between about 33° Fahrenheit and 60° Fahrenheit requires a tremendous volume of cold water or another cooling liquid. To produce such large quantities of cold water, rather expensive and large capacity refrigeration equipment must be used. During food processing, operation of this refrigeration equipment to produce the desired volume of cold water is expensive.

As a result, a combination blancher and cooler having multiple cooling zones is needed for more precisely controlling cooling of food product. What is also needed is a combination blancher and cooler having multiple cooling zones that more efficiently uses chilled and cooled water, or another cooling liquid, for more economically cooling food product. What is still further needed is a combination blancher and cooler having multiple cooling zones that more economically cools food product by using, at least in part, well or ground water to minimize the amount of cold water that must be produced using refrigeration equipment.

SUMMARY OF THE INVENTION

A food processing apparatus that includes (1) a blancher which has a tank compartment and drum segment for receiving and heating food product, (2) a precooling tank compartment and drum segment for receiving and cooling food product, and (3) a cooling or chilling tank compartment for receiving and further cooling food product after the food product has been heated and precooled. Where water is the cooling medium received in each of the cooling tank compartments, it preferably is maintained in the precooling tank compartment at a temperature of between about 55° Fahrenheit and about 75° Fahrenheit for precooling food product, and is maintained in the cooling tank compartment at a temperature of between about 55° Fahrenheit and about 32° Fahrenheit for further cooling the food product. Where food product is to be chilled after precooling, the water in the cooling tank compartment is maintained at a temperature preferably of between about 33° Fahrenheit and about 35° Fahrenheit. Each cooling tank compartment preferably can be constructed and arranged such that cooling water flows generally in an opposite direction to food product flow, generally creating a counterflow heat exchanging arrangement within the cooling tank compartment.

The food processing apparatus includes a tank having a sidewall of generally recessed construction and a pair of end walls defining the tank and allowing a bath of liquid to be received in the tank. The food processing apparatus of this invention includes at least two spaced apart dividing baffles which separate the tank into at least three tank compartments, with each tank compartment receiving a bath of a heating or cooling liquid therein.

Preferably, the tank has a first dividing baffle generally adjacent to but spaced from an inlet end of the tank and a second dividing baffle generally adjacent to but spaced from a discharge end of the tank, both of which separate the tank into three compartments: (1) a first tank compartment adjacent the tank inlet end and where food product is heated preferably to cook or blanch the food product; (2) a second tank compartment adjacent the inlet end tank compartment where the food product is precooled after being heated in the inlet end tank compartment; and (3) a third tank compartment adjacent the discharge end of the tank and adjacent the second tank compartment for further cooling food product after the food product has been heated in the inlet end tank compartment and precooled in the second tank compartment. In a preferred three tank compartment food processing apparatus arrangement of this invention, the second tank compartment preferably is located in the middle between the inlet end tank compartment and the discharge end tank compartment. A food processing apparatus of this invention can have more than three tank compartments, so long as it has at least one heating tank compartment and at least two cooling tank compartments.

Received in the tank is a food transport assembly that preferably is an auger having a first auger portion received in the inlet end tank compartment, a second auger portion received in the middle or precooling tank compartment, and a third auger portion received in the discharge end or cooling tank compartment. Each auger portion preferably is comprised of at least two axially spaced apart flights that are connected to form a generally helical food product urging surface that urges food product generally toward the discharge end of the tank when rotated.

Enclosing the auger preferably is a generally cylindrical and axially elongate drum. For the preferred three tank compartment food processing apparatus arrangement of this invention, the drum preferably is comprised of three segments. The drum has a first segment adjacent the inlet end which is received in the inlet end tank compartment and which substantially encloses the first auger portion. Adjacent the first drum segment, the drum has a second segment which is received in the precooling tank compartment and which substantially encloses the second auger portion. The drum has a third segment which is received in the cooling tank compartment and which substantially encloses the third auger portion.

Each drum segment includes a pair of spaced apart end plates that preferably have a through opening therein to allow passage of food product therethrough. To substantially enclose the auger portion, between each pair of end plates of each drum segment there is a generally cylindrical sidewall that preferably is of perforate construction for allowing water from within a tank compartment to penetrate inside the drum segment such that the water comes into contact with food product during operation. The perforate sidewall of each drum segment preferably is composed of panels that are removable to allow cleaning and access into the tank and drum segment.

To make each drum segment stronger and structurally more rigid, each pair of end plates of each drum segment preferably is connected by a plurality of circumferentially spaced apart and axially extending support channels. Preferably, the outer peripheral edges of at least some of the flights of each auger portion are affixed to support channels so that the auger portion and its drum segment rotate substantially in unison during operation.

Generally surrounding each food product through opening of each drum segment end plate is a generally cylindrical and axially outwardly extending flange that preferably forms a generally cylindrical drum segment journal for facilitating rotation of the drum segment. Preferably, the journal of each drum segment rides upon trunnions carried by a tank end wall or a dividing baffle to rotatively support the drum segment.

Between adjacent drum segments, a journal flange can connect adjacent drum segment end plates together to form a torque transmitting tube so that the connected, adjacent drum segments rotate substantially in unison. To enable adjacent drum segments to rotate independently of each other, one of the journal flanges of one adjacent drum segment end plate can have a smaller diameter than the journal flange of the other adjacent drum segment end plate so that one of the journal flanges is telescopically received within the other of the journal flanges without rigidly connecting the adjacent drum segments together. Preferably, each such journal flange is rotatively supported by trunnions.

During operation, each auger portion rotates so that the food product urging surface of each auger portion urges food product in its drum segment toward the discharge end of the drum segment. To transfer food product out of a drum segment once the food product has reached the discharge end, each drum segment has a food transfer assembly. Preferably, each food product transfer assembly comprises a chute adjacent the end plate discharge opening of the drum segment with the chute being inclined so that food product received on the chute slides down the chute, out the discharge outlet, and out of the drum segment. To put food product on the chute so it can be transported out of the drum segment, there is a radially inwardly extending lifting flight that is attached to the drum segment adjacent the chute so it rotates in unison with the drum segment. During rotation, the lifting flight scoops food product out of the water that is inside the drum segment and deposits it on the chute where the food product, in turn, is transported out of the drum segment.

To provide cooling water to each of the cooling tank compartments, each cooling tank compartment has at least one cooling water inlet and at least one cooling water outlet. The cooling water inlet of the precooling tank compartment preferably can be located adjacent the discharge end dividing baffle and the cooling water outlet of the precooling tank compartment preferably can be located adjacent the inlet end dividing baffle. Likewise, the cooling water inlet of the cooling tank compartment can be located adjacent the discharge end tank end wall and the cooling water outlet of the cooling tank compartment can be located adjacent the discharge end dividing baffle. As a result of this preferred construction, during operation cooling water generally flows in a direction opposite the direction that food product is traveling thereby creating a counterflow cooling arrangement within both the tank compartment and the corresponding drum segment received in the tank compartment.

In a first preferred source of cooling water for the cooling tank compartments, well water or ground water preferably is supplied to the precooling tank compartment to save energy and money by minimizing and preferably substantially eliminating the need to refrigerate water provided to the precooling tank compartment. Preferably, refrigerated water is supplied to the cooling tank compartment. If desired, some of the makeup water for the refrigerated water source can be ground water or well water to further maximize energy savings and minimize energy costs.

In a second preferred cooling water supply arrangement, refrigerated water discharged from the cooling tank compartment makes up at least part of the water introduced into the precooling tank compartment. If additional cooling water is needed for the precooling tank compartment, well water or ground water is supplied to the precooling tank compartment.

In a third preferred cooling water supply arrangement, refrigerated water is introduced into the cooling tank compartment. Water discharged from the cooling tank compartment is introduced into the precooling tank compartment. Water discharged from the precooling tank compartment preferably is returned to the refrigeration apparatus, that can be a chiller or the like, for recooling and reuse.

In a fourth preferred cooling water supply arrangement, refrigerated water is introduced directly into the precooling tank compartment and directly into the cooling tank compartment. Water discharged from each of these tank compartments preferably is returned to be recooled and reused. Preferably, one or more chillers can be used to cool the water before it is pumped to the desired tank compartment.

In operation, food product is introduced into the inlet end drum segment where it is heated preferably by being immersed in hot water or another heating liquid. Preferably, the food product is cooked or blanched in the inlet end drum segment by being heated by water having a temperature that is greater than 100° Fahrenheit and preferably between about 160° Fahrenheit and about 210° Fahrenheit.

After being heated, the food product is transferred to the middle drum segment where it is precooled. Cooling water in the precooling tank compartment precools the food product preferably gradually thereby minimizing and preferably substantially completely preventing damage to the food product. Preferably, during precooling, the temperature of each piece of food product that comes into contact with water in the middle or precooling tank compartment is cooled such that its temperature is lowered, at least somewhat.

To accomplish gradual cooling of the food product, the water in the precooling tank compartment preferably has a temperature of between about 55° Fahrenheit and about 75° Fahrenheit. To further accomplish gradual cooling, cooling water can preferably be introduced into the precooling tank compartment adjacent the discharge end of the drum segment and downstream of where food product enters the drum segment, and can be exhausted from the precooling tank compartment at a location adjacent where the food product enters the drum segment. To minimize the energy required to produce the precooling water, at least some of the water in the precooling tank compartment can be made up of well water or ground water.

After being precooled, the food product is transferred to the discharge end drum segment where the food product is further cooled. Cooling water in the discharge end or cooling tank compartment is at a temperature where it further gradually cools the food product also to minimize and preferably substantially completely prevent damage to the food product during cooling. Preferably, the temperature of each piece of food product that comes into contact with water in the cooling tank compartment is lowered, at least somewhat.

To help accomplish gradual cooling, the water in the discharge end or cooling tank compartment preferably has a temperature of between about 32° Fahrenheit and about 55° Fahrenheit. To further gradually cool the food product, cooling water is preferably introduced into the cooling tank compartment adjacent the discharge end of the tank and downstream of where food product enters the drum segment and is exhausted from the cooling tank compartment at a location adjacent where the food product enters the drum segment. If it is desired to chill the food product after it has been suitably precooled, the water in the cooling tank compartment preferably has a temperature of between about 33° Fahrenheit and about 35° Fahrenheit.

After cooling or chilling is completed, the food product is discharged from the food processing apparatus where it preferably can be packaged and stored for awaiting shipment and sale.

Objects, features and advantages of this invention are to provide a food processing apparatus that is an integral unit which heats food product and thereafter cools the food product in stages or zones to relatively gradually cool the food product for minimizing and preferably substantially completely preventing cooling damage to the food product; is a unitary food processing apparatus that both heats and cools food product in the same unit thereby advantageously saving food processing plant floor space; is a food processing apparatus having at least one heating zone and multiple cooling regions, stages or zones located adjacent each other minimizing the distance the food product must travel during processing thereby advantageously saving processing time; reduces the amount of equipment needed to process food product saving money; is capable of using well water or ground water to precool the food product thereby saving energy and money; is versatile in that heating and cooling liquids other than water can be used in the tank compartments of the food processing apparatus; and is a food processing apparatus that is rugged, simple, flexible, reliable, and durable, and which is of economical manufacture and is easy to assemble and use.

BRIEF DESCRIPTION OF THE DRAWINGS

These and other objects, features, and advantages of this invention will become apparent from the following detailed description of the best mode, appended claims, and accompanying drawings in which:

DETAILED DESCRIPTION OF THE INVENTION

I. Introduction

Figure 1:
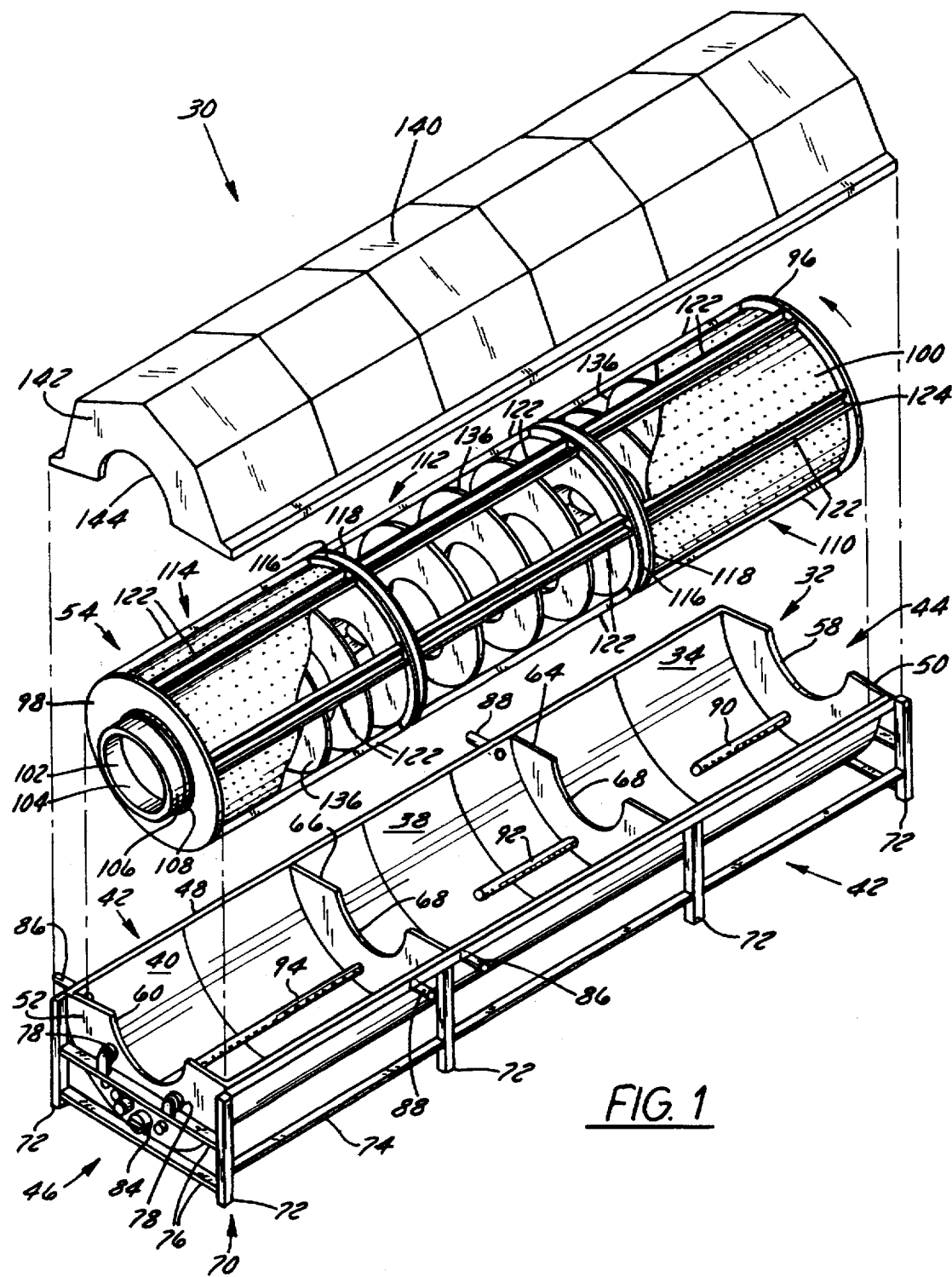
FIG. 1 is an exploded perspective view of a blanching and cooling apparatus of this invention having multiple cooling zones and which includes a tank with multiple drum segments and tank compartments along with an auger food transport mechanism that is received in the tank.

FIGS. 1–4 illustrate a food processing apparatus 30 of this invention that has a tank 32 with a first compartment 34 for blanching or cooking a food product 36 (FIG. 3), a second compartment 38 for cooling the food product after it has been blanched or cooked, and a third compartment 40 for further cooling the food product 36. In this manner, cooling a blanched food product can be carefully controlled and relatively gradually done to minimize and preferably substantially prevent damage to the food product while decreasing both the time and floor space required to both heat and cool the food product.

In a preferred embodiment of the food processing apparatus 30 of this invention, to minimize the cost to cool food product 36, at least some of the cooling water introduced into the second tank compartment 38 is water pumped from the ground or a well. To maximize cooling of the food product 36, the food processing apparatus 30 can be constructed so that the flow of cooling water in each cooling tank compartment 38 & 40 is in a direction opposite the direction of travel of the food product 36 in the tank compartment for creating a counterflow heat exchanging arrangement. Preferably, a food processing apparatus 30 of this invention can have more than three compartments, so long as it has at least one heating compartment and at least two cooling compartments.

II. Food Processing Apparatus

As is shown in FIG. 1, the food processing apparatus 30 is a blancher 42 having multiple cooling zones 38 & 40 for controllably heating and cooling food product 36 that travels through the food processing apparatus 30. The food processing apparatus 30 includes the tank 32 having an inlet end 44 and a discharge end 46 and which is formed of a sidewall 48 of generally arcuate, segmented or curvilinear construction that is capped at each end by an end wall 50 & 52.

Received in the tank 32 is a generally cylindrical and elongate drum 54 that substantially encloses a food transport mechanism 56 that preferably is a rotatable auger. The drum 54 is preferably of perforate construction to allow water within the tank 32 to enter the drum 54. Preferably, the drum 54 and auger 56 are constructed and arranged to rotate substantially in unison.

A. Tank Construction

To help facilitate entry and removal of food product 36, the inlet end wall 50 of the tank 32 has an inlet opening 58 and the discharge end wall 52 has a discharge opening 60. To divide the tank 32 into the three separate but preferably adjacent compartments 34, 38 & 40, there are a pair of spaced apart baffles 64 & 66 received in the tank 32 between the end walls 50 & 52 which function as tank compartment dividing walls. To help facilitate food product flow through the apparatus 30, each baffle 64 & 66 has an opening 68 that preferably is generally arcuately shaped. Even with each baffle 64 & 66 having a food product flow facilitating opening 68, each baffle 64 & 66 preferably is of a sufficient height and constructed and arranged to prevent mixing of fluid or liquid between tank compartments during food processing apparatus operation.

Figure 3:
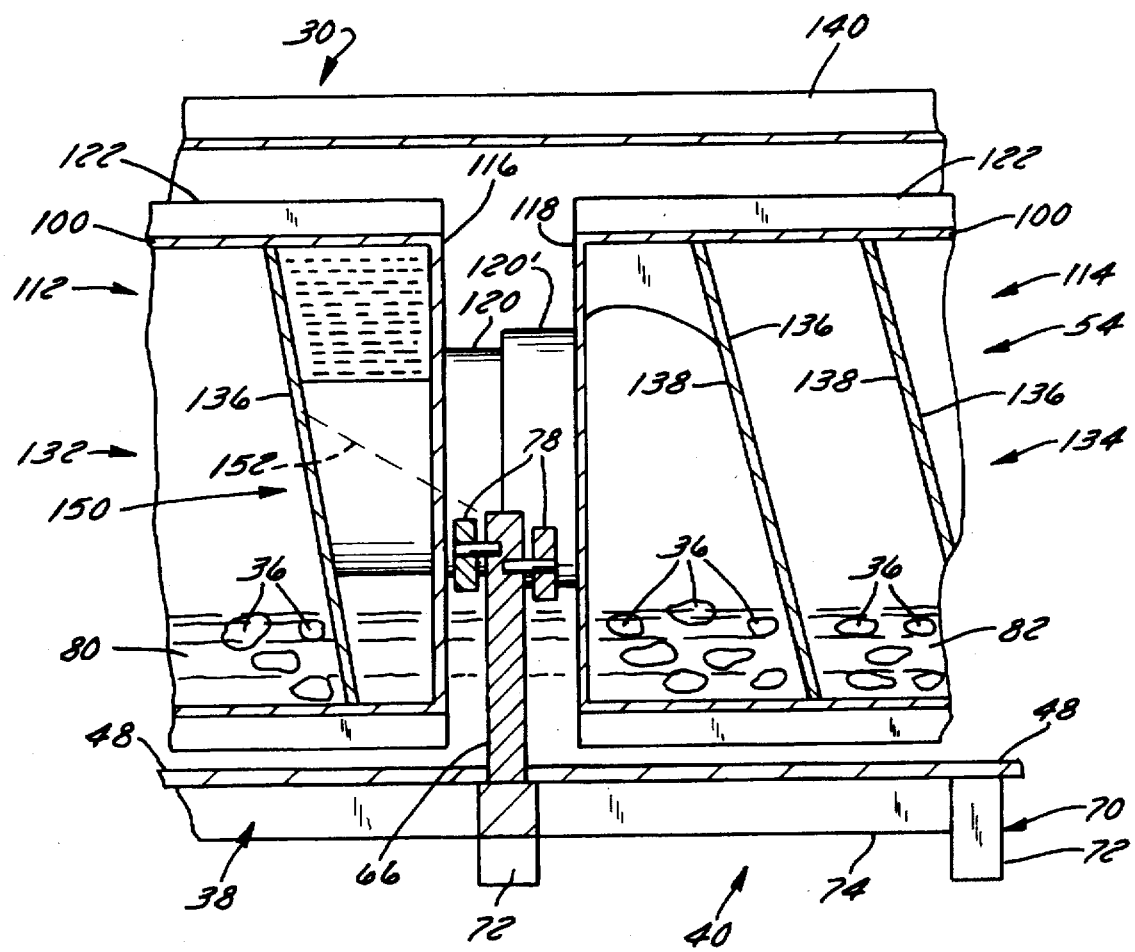
FIG. 3 is a fragmentary side sectional view of an apparatus of this invention having adjacent drum segments constructed and arranged so that they can be rotated independently of each other.

The tank 32 is cradled in a support frame 70 that has legs 72 which rest upon the ground and thereby space the tank 32 above the ground. In addition to its legs 72, the frame 70 is constructed of a plurality of elongate longitudinal support struts 74 that are in operable communication with the tank 32 and transverse support struts 76 which connect the longitudinal struts 74. Referring additionally to FIG. 3, one or more support struts preferably directly underlie the tank 32 to help support the food processing apparatus 30.

To rotatably support the drum 54 and/or auger 56, the uppermost transverse support strut 76 at each end of the tank 32 is equipped with at least two spaced apart trunnions 78. As is shown in FIG. 1, there is a pair of spaced apart trunnions 78 carried by a discharge end transverse support strut 76 adjacent the discharge end wall discharge opening 60. Although not shown, there preferably is also another pair of trunnions carried by an inlet end transverse support strut 76 that lies adjacent the inlet end wall inlet opening 58. As is depicted in FIG. 3, to further support the auger 56, each dividing baffle 64 & 66 can also carry trunions 78.

The tank 32 has at least three tank compartments 34, 38 & 40 and in the preferred embodiment shown in FIG. 1 has exactly three tank compartments 34, 38 & 40. Adjacent the inlet end 44 of the tank 32, there is a blanching tank compartment 42 that preferably is the inlet end tank compartment 34 where food product 36 upon entering the drum 54 is heated by a bath of hot water received in the inlet end tank compartment 34. The second or middle tank compartment 38 is a tank compartment having a bath 80 of water (FIG. 3) that is colder than the temperature of the water in the inlet end tank compartment 34 for at least somewhat cooling food product 36 after it has been heated in the inlet end or blanching tank compartment 34.

The third tank compartment 40 is the tank compartment that preferably is immediately adjacent the middle tank compartment 38 and is also the cooling tank compartment shown in FIG. 1 that is nearest the outlet or discharge end 46 of the tank 32. The discharge end tank compartment 40 has a bath 82 of water that is at least as cold as the water bath 80 in the middle tank compartment 38 for cooling food product 36 that comes into contact with the water 82 in the discharge end tank compartment 40. Preferably, the water 82 in the discharge end tank compartment 40 is colder than the water 80 in the middle tank compartment 38 for further cooling food product 36 that comes into contact with water 82 in the discharge tank compartment 40 after it has been at least somewhat cooled by the water 80 in the middle tank compartment 38.

To facilitate the introduction of water into each tank compartment and removal of water from each tank compartment, each tank compartment has a plurality of fittings and piping connections. As is shown in FIG. 1, the discharge end wall 52 of the tank 32 has at least one outlet 84 that is a clean out port 84 for facilitating draining and/or cleaning of the discharge tank compartment 40. Each of the other tank compartments preferably can be constructed with a clean out port of similar or substantially identical construction. Preferably, the inlet end tank compartment 34 has such a clean out port (not shown).

Figure 4:
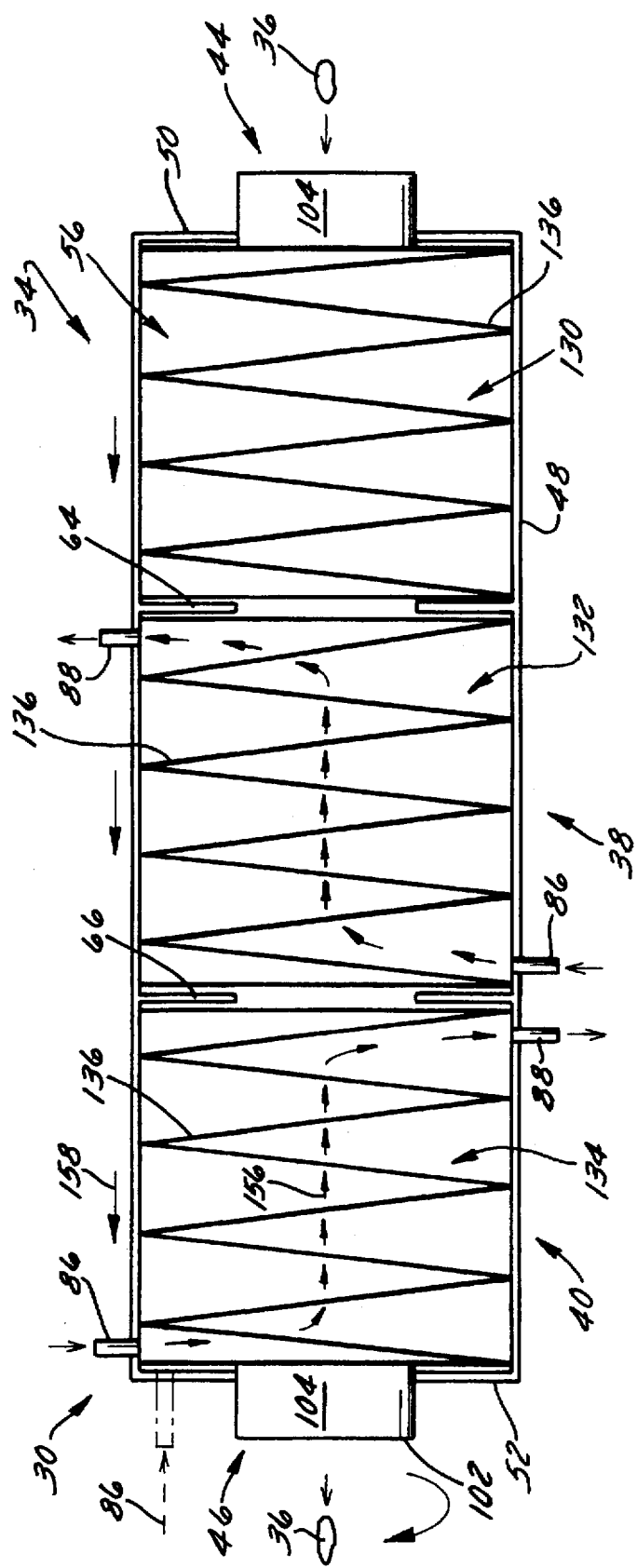
FIG. 4 is a top sectional plan view of the blanching and cooling apparatus of this invention illustrating preferred cooling liquid flow within each of the cooling tank compartments.

To introduce water into each of the cooling tank compartments 38 & 40 and to remove water from each of the cooling tank compartments 38 & 40, each tank compartment preferably has a pair of spaced apart cooling water inlet and outlet piping connections 86 & 88. As is shown in FIGS. 1 & 4, each cooling tank compartment 38 & 40 has at least one cooling water inlet 86 where cooling water enters the tank compartment and at least one cooling water outlet 88 where water is exhausted from the tank compartment. Preferably, the water inlet 86 of each cooling tank compartment 38 & 40 is downstream, relative to the direction of food product flow, of the water outlet 88 for creating a counterflow heat exchanging arrangement to increase the rate of food product cooling.

As is illustrated in FIG. 1, the water inlet 86 of the first cooling tank compartment (middle cooling compartment) 38 is preferably adjacent the discharge end dividing baffle 66 and the water outlet 88 is preferably adjacent the inlet end dividing baffle 64 for creating a counterflow heat exchanging arrangement in the first cooling tank compartment 38. As is further depicted in FIG. 1, the water inlet 86 of the second cooling tank compartment (discharge end) 40 is preferably adjacent the discharge end wall 52 of the tank 32 and the water outlet 88 is preferably adjacent the discharge end dividing baffle 66 for creating another such counterflow heat exchanging arrangement in the second cooling tank compartment 40.

If desired, the inlets 86 and outlets 88 of either or both cooling tank compartments 38, 40 can be constructed and arranged in the manner shown in FIG. 1 to form such a counterflow heat exchanging arrangement. The inlets 86 and outlets 88 of both tank compartments 38 & 40 can be on either side of the tank 32, on opposites sides of the tank 32 or any suitable combination thereof. Although the inlets 86 and outlets 88 are shown adjacent the top of the tank 32, either the inlets 86, the outlets 88, or both the inlets 86 and outlets 88 can be located nearer to or adjacent the bottom of the tank 32, if desired. Additionally, the inlet 86 of the second cooling compartment 40 can be located at the discharge end tank end wall 52, if desired.

To further enhance heat transfer during blanching, the heating tank compartment 34 preferably has at least one manifold 90 received therein and can have two or more manifolds received therein. The manifold 90 preferably is an elongate hollow tube or pipe, such as is depicted in FIG. 1, that is connected to a supply of water, air or steam and which is perforate for allowing the supply medium to be introduced from the manifold into the tank compartment 34. During operation, the supply medium is pumped through the manifold 90 into the tank compartment 34 to agitate the liquid inside the tank compartment 34 to promote turbulence and prevent temperature stratification of the liquid within the tank compartment 34. If desired, the manifold 90 can be used to introduce hot water into the tank compartment 34. To further enhance heat transfer and promote turbulence, steam can also be introduced into the tank compartment 34 through the manifold 90.

Either or both cooling tank compartments 38, 40 can also be equipped with one or more manifolds 92 & 94, such as for introducing cold water into a cooling tank compartment, or for introducing air, that preferably is pressurized, into the water bath in the cooling tank compartment to agitate the water bath and food product 36 in the bath to increase heat transfer between the cold water and food product 36.

B. Drum and Food Product Transport Mechanism

Referring to FIG. 1, the drum 54 is an elongate cylinder having an inlet end plate 96 adjacent the tank inlet opening 58 and a discharge end plate 98 adjacent the tank discharge opening 60 with a generally cylindrical and perforate sidewall 100 that substantially extends between the end plates 96 & 98. Each end plate 96 & 98 has a food product opening 102 generally defined by an axially outwardly extending flange 104 that also functions as a journal 106 which rides upon the trunnions 78 to help enable the drum 54 to be rotated during operation. Carried by one of the journals 106 preferably is a sprocket 108 for receiving an endless flexible member (not shown) that preferably is a belt, chain or the like to communicate power from a prime mover (also not shown), such as an electric, internal combustion or hydraulic motor, to the drum to rotate the drum. Of course, the drum 54 can be rotatively driven in another manner to cause it to rotate within the tank 32. The sprocket 108 is shown in FIG. 1 carried by the journal 106 of the discharge end plate 98.

Figure 2:
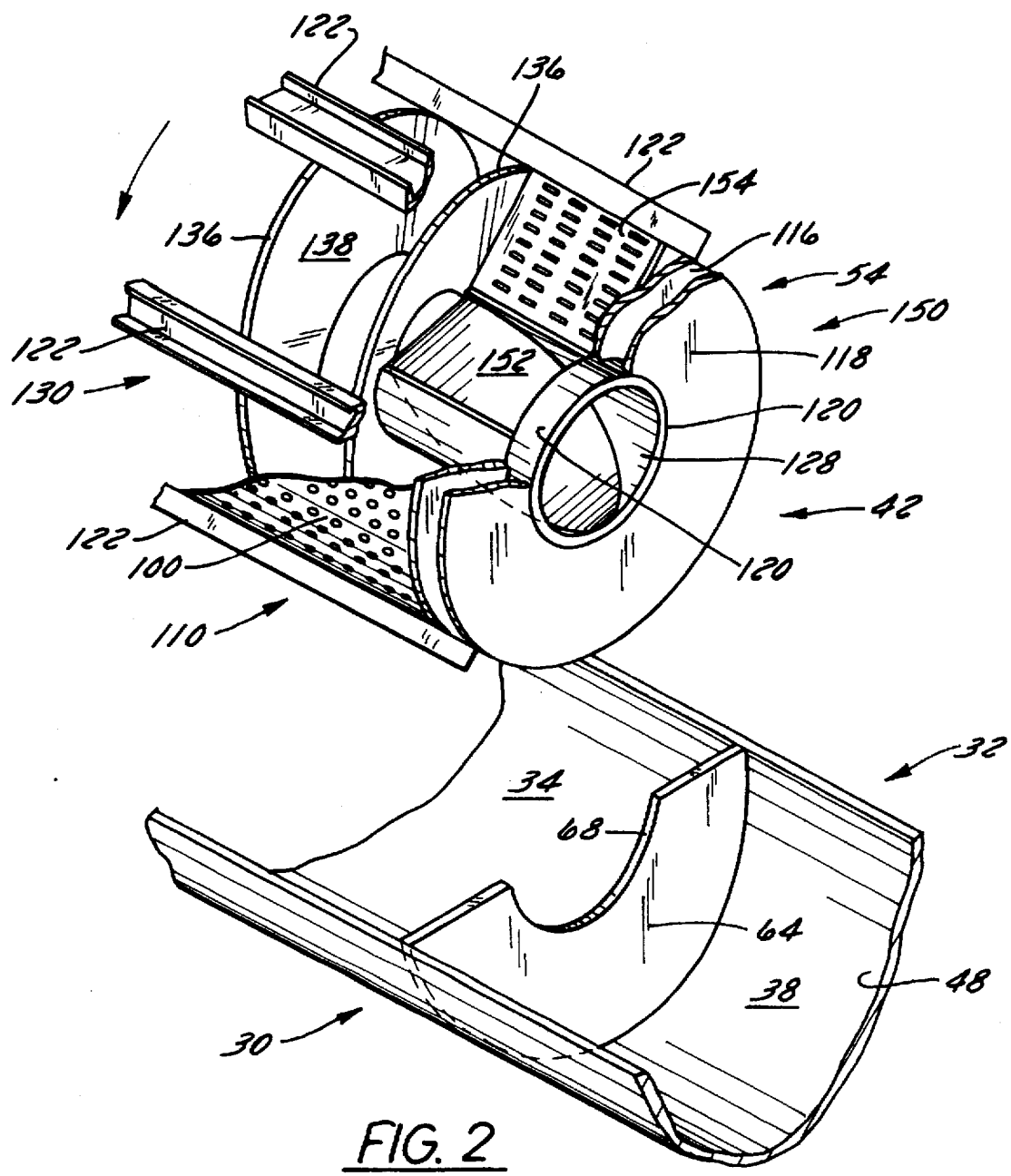
FIG. 2 is a fragmentary perspective view of a baffle of the apparatus dividing a tank of the invention into separate compartments and a food product transfer assembly for transferring food product from one drum segment to the next drum segment.

The drum 54 is comprised of three individual drum segments 110, 112 & 114. The drum 54 has an inlet end drum segment 110 received in the inlet end tank compartment 34, a discharge end drum segment 114 received in the discharge end tank compartment 40 and a middle drum segment 112 received in the middle tank compartment 38. Within each drum segment lies a portion of the auger 56 that is substantially enclosed by the drum segment. Referring to FIGS. 1 & 2, between each pair of adjacent drum segments, such as drum segments 110 & 112 and 112 & 114, are a pair of spaced apart drum segment end plates 116 & 118, both of which preferably have a diametrically necked down axially extending flange or tube 120 that defines a generally cylindrical journal surface 126 located at the dividing baffle the tube 120 overlies. The tube 120 and an opening in each pair of adjacent drum segment end plates 116 & 118 help facilitate passage of food product 36 from one drum segment to the next drum segment during operation.

To give more strength and structural rigidity to each drum segment 110, 112 & 114 and to the drum 54 as a whole, there are a plurality of circumferentially spaced apart support channels 122 that extend from the inlet end plate to the discharge end plate of each drum segment. Each channel 122 preferably has a generally C-shaped cross section.

Each support channel 122 has one end affixed to the inlet end plate of a drum segment and its other end affixed to the discharge end plate of the same drum segment. Preferably, each channel 122 is affixed at each end to an end plate, such as by welding. While the end of each support channel 122 can be welded directly to an axially facing flat portion of an end plate, each end of each channel 122 is preferably welded to a generally axially inwardly extending lip 124 (FIG. 1) of the end plate. In addition to serving as a mounting surface for the channels 122, the lip 124 also advantageously makes each end plate and drum segment stronger and preferably more structurally rigid.

Each drum segment 110, 112 & 114 has a generally cylindrical and perforate sidewall 100 that substantially encloses the portion of the auger 56 that lies within the drum segment. The perforations in the drum sidewall 100, shown exaggerated in FIG. 1 for clarity, consist of a plurality of relatively small diameter bores that extend completely through the sidewall 100 to allow water to pass from the tank compartment through the sidewall 100 and into the drum segment with the drum 54 received in the tank 32. Preferably, the perforate sidewall 100 is composed of a plurality of resilient and somewhat flexible perforate panels that extend between adjacent support channels 122. Each perforate drum sidewall panel preferably is removable for cleaning and to permit access to the interior of the drum segment.

The food product through opening 68 of each dividing baffle 64 & 66 preferably is complementary to the cylindrical journal 126 for enabling the dividing baffle to serve as a bearing surface upon which the journal 126 rides. Preferably, however, each dividing baffle 64 & 66 has at least one pair of trunnions 78, such as is depicted in FIG. 3, for rotatively supporting the drum 54 at each baffle 64 & 66.

Referring to FIG. 2, one or both pairs of adjacent drum segments can be generally rigidly joined together by the end plate flange 120 of one of the adjacent drum segment end plates 116 extending to and being connected to the other of the adjacent drum segment end plates 118. As a result, the flange 120 functions as a generally rigid tube 120 capable of transmitting torque between adjacent drum segments while also allowing food product 36 to pass through a discharge opening 128 in the tube 120 between adjacent drum segments. As a result of this rigid connecting tube 120 connecting adjacent drum segments, connected adjacent drum segments rotate substantially in unison.

Referring to FIG. 3, where the capability of producing relative rotation between adjacent drum segments is desired, for example drum segments 112 & 114, one of the generally cylindrical end plate flanges 120 of one adjacent end plate 116 is coaxially and telescopically received within a larger diameter generally cylindrical end plate flange 120' of the other adjacent end plate 118 without the flanges 120 & 120' being affixed to each other or connecting together both adjacent end plates 116 & 118. Preferably, each flange 120 & 120' of each such pair of adjacent drum segment end plates is rotatively supported by trunnions 78 that are carried by the baffle 66, such as in the manner depicted in FIG. 3.

Each drum segment 110, 112 & 114 has a food product transport mechanism 56 that preferably is an auger or a portion of an auger that urges food product 36 in the drum segment toward a discharge end of the drum segment. The inlet end drum segment 110 substantially encloses an inlet end auger portion 130. The discharge end drum segment 114 substantially encloses a discharge end auger portion 134. The middle drum segment 112 substantially encloses a middle auger portion 132.

Each auger portion 130, 132 & 134 consists of a plurality of axially spaced apart auger flights 136 that are connected and constructed and arranged to form a generally helical food product urging surface 138. During operation, each auger portion 130, 132 & 134 is rotated to urge food product 36 entering the drum segment from the inlet end toward the discharge end of the drum segment.

Portions of the outer radial peripheral edge of at least some of the auger flights 136 of each drum segment are connected to the support channels 122 of the drum segment preferably by being directly affixed to the support channels. Preferably, the auger flights 136 are welded to the support channels 122 where they bear against the channels 122. As a result, each auger portion 130, 132 & 134 is substantially supported by the support channels 122 of its corresponding drum segment, as well as also the end plates of the drum segment.

Due to this construction, each auger portion 130, 132 & 134 rotates substantially in unison with its drum segment 110, 112 & 114. However, if desired, each auger portion and corresponding drum segment can be constructed and arranged such that the auger portion and its associated drum segment are capable of relative rotation. Preferably, each auger portion 130, 132 & 134 rotates in unison with its corresponding drum segment 110, 112 & 114.

The auger 56 shown in FIGS. 1–4 is of coreless construction. If desired, auger flights 136 of the auger 56 or an auger portion 130, 132 and/or 134 can be carried by or on a core (not shown) for allowing the construction of (1) longer drums and tanks and (2) larger diameter drums by providing more strength and structural stability to the auger. If a support core is used, inner radial peripheral edges of auger flights 136 are welded to the core. Preferably, the core is generally coaxially received within the drum segment, and the core and auger portion have an axis of rotation that generally coincides with an axis of rotation of the drum segment.

Overlying the drum 54 is a cover 140 that mates with the tank 32 and which cooperates with the tank 32 to substantially completely enclose all of the segments 110, 112 & 114 of the drum 54 during operation. Preferably, the cover 140 is hingedly connected to the tank 32 so it can be swung away from the drum 54 to permit access to the drum 54 and the interior of the tank 32. Preferably, the cover 140 has a pair of sidewalls 142, each with an opening 144 complementary with the drum journal 106 for helping to facilitate rotation. If desired, the cover 140 can be of vaulted or segmented construction, such as the cover 140 depicted in FIG. 1.

C. Food Product Transfer Assembly

Referring to FIGS. 2 & 3, each drum segment 110, 112 & 114 has a food transfer assembly 150 for transferring food product 36 within a drum segment out of the drum segment. This enables food product 36 to be transferred between adjacent drum segments and food product 36 to be transferred from the last drum segment 114 out the discharge outlet 102. Since the food product transfer assemblies 150 of each drum segment of the preferred embodiment shown in FIG. 1 can be and preferably are substantially similar in construction, only one food product transfer assembly used to transfer food product from the inlet end drum segment 110 to the middle drum segment 112, shown in FIG. 2, will be further discussed herein.

As is shown in FIG. 2, the food product transfer assembly 150 has a discharge chute 152 for receiving food product 36 from one drum segment 110 and transferring it to the next drum segment 112. The chute 152 is preferably located between an axially adjacent auger flight 136 of one drum segment 110 and the inlet end plate 118 of the next drum segment 112. The chute 152 has an inclined surface adjacent the discharge opening 128 that is downwardly canted toward the discharge opening 128 so that food product 36 received on the chute 152 will slide down the chute 152 and out the opening 128.

To lift food product 36 out of the water within the drum segment 110 and transfer it to the chute 152, a preferred embodiment of the food product transfer assembly 150 has a single lifting flight 154 that extends radially inwardly from adjacent the drum sidewall 100 toward the chute 152. The lifting flight 154 preferably comprises a perforated plate that preferably can be welded to a portion of the chute 152. As is depicted in FIG. 2, during rotation of the auger portion 130, the lifting flight 154 lifts food product 36 from the water bath within the drum segment 110 and deposits the food product 36 onto the chute 152 where it slides down the chute 152 and out the discharge opening 128. Where food product 36 is being transferred from one drum segment to the next, as the food product 36 passes through the discharge opening 128, it enters the next drum segment and preferably is received in the water bath of that next drum segment.

Although the food transfer assembly 150 shown in FIGS. 2 & 3 uses only one lifting flight 154, if desired, more than one lifting flight or a plurality of lifting flights can be used to transfer food product 36 to the discharge chute 152 of a drum segment.

III. Preferred Heating and Cooling Temperatures

Where water is used as the heating medium, the temperature of the water bath received in the inlet end tank compartment preferably has a temperature of at least about 100° Fahrenheit and no greater than about 212° Fahrenheit. Where blanching or cooking of food product 36 received in the first drum segment 110 is performed, the temperature of the water bath in the inlet end tank compartment 34 is maintained at a temperature of at least about 160° Fahrenheit and no greater than about 210°–212° Fahrenheit.

Where water is used in the middle tank compartment 38 to begin cooling the food product 36 after it has been heated, the water bath 80 in the middle tank compartment 38 preferably has a temperature of at least about 55° Fahrenheit and no greater than about 75° Fahrenheit. Where water is used to further cool food product 36 in the discharge end drum segment 114 after it has been cooled at least somewhat in the middle drum segment 112, the water bath 82 in the discharge end tank compartment 40 preferably has a temperature of at least about 32° Fahrenheit and no greater than about 55° Fahrenheit. To chill food product 36 after it has been cooled in the middle drum segment 112, the water bath 82 in the discharge end tank compartment 40 has a temperature of between about 33° Fahrenheit and about 35° Fahrenheit.

It is contemplated that heating and cooling liquids other than water can be used with the food processing apparatus 30 of this invention. For example, ethylene glycol, a mixture of ethylene glycol and water, another alcohol coolant, a suitable water and alcohol mixture, or another suitable coolant can be used in either or both cooling tank compartments 38 & 40.

If the cooling liquid possesses a greater capacity to cool food product than water, suitable temperatures at which it can be used can be higher than for water. For example, if the cooling liquid possesses a greater capacity to cool than water, its temperature in the middle tank compartment 38 preferably is no greater than about 90° Fahrenheit and is at least about 55° Fahrenheit and its temperature in the discharge end tank compartment 40 preferably is no greater than about 70° Fahrenheit and can be lower than 32° Fahrenheit, if desired. If the cooling liquid possesses about the same capacity to cool as water or has a lesser capacity to cool, the preferred temperature ranges quoted above for water apply.

IV. Preferred Piping and Cooling Liquid Source Arrangements

A. Counterflow Heat Exchanging Piping Arrangement

Referring to FIGS. 1 and 4–8, either or both the discharge end tank compartment 40 and middle tank compartment 38 can have the cooling water inlet 86 and cooling water outlet 88 routed as shown in FIG. 4 to create a counterflow heat exchanging arrangement within the corresponding drum segment and tank compartment. Since inlet and outlet routing preferably is substantially identical for both tank compartments 38 & 40, only the inlet and outlet piping connections 86 & 88 of the discharge end tank compartment 40 will be further described herein.

The discharge end tank compartment 40 has an inlet 86 adjacent the discharge end tank end wall 52 and an outlet 88 adjacent dividing baffle 66 for creating a flow of cooling water generally in the direction indicated by the several arrows 156 within the discharge end tank compartment 40 shown in FIG. 4. During operation, the auger 134 rotates urging food product 36 in the discharge end drum segment 114 to travel from adjacent the discharge end dividing baffle 66 toward the discharge outlet 102 as is indicated by the single arrow 158 exterior and adjacent to the discharge tank compartment 40 shown in FIG. 4. As a result, food product 36 moves in a direction 158 that is generally opposite to the direction 156 of the flow of cooling water within the discharge end tank compartment 40 creating a counterflow heat exchanging arrangement within the tank compartment 40 that preferably helps to maximize efficient cooling of the food product 36 within the discharge end drum segment 114. If the discharge end tank compartment 40 has a manifold 94 therein, water or pressurized air can also be introduced into the tank compartment 40 to create heat transfer promoting turbulence, to agitate food product 36 within the drum segment 114, and to prevent temperature stratification of the water within the tank compartment 40.

The inlet 86 can be located either on the sidewall of the tank 32 adjacent the discharge end tank end wall 52 or on the discharge end tank end wall 52 itself, such as is shown in phantom in FIG. 4. If the inlet 86 is located on the discharge end tank end wall 52, the adjacent discharge end drum end plate 98 can be constructed having one or more throughbores to allow relatively unobstructed flow into the tank compartment 40 and drum segment 114. If desired, the discharge end drum end plate 98 can be perforated to facilitate flow of water from a tank end wall located cooling water inlet 86 into the drum segment.

If desired, hot or heated water can be introduced into the inlet end tank compartment 34 using the same or a similar inlet and outlet piping arrangement.

B. Cooling Liquid Source and Piping Arrangements

Referring more particularly to FIGS. 5–8, preferred embodiments illustrating sources of cooling liquid and routing of the cooling liquid sources in providing cooling liquid to both the middle cooling tank compartment 38 and discharge end cooling tank compartment 40 are shown in schematic or diagram form. To provide at least some cooling water to the discharge end tank compartment 40, a cooling unit 160 that has been designated by the term "chiller" is shown in FIGS. 5–8. The use of chiller 160 in this context simply indicates that the cooling water for one or more of the cooling tank compartments of the apparatus 30 has been produced using refrigeration or cooling equipment that requires electricity, gas or another power source to produce cooled or cold water at a desired temperature or temperature range.

Figure 5:
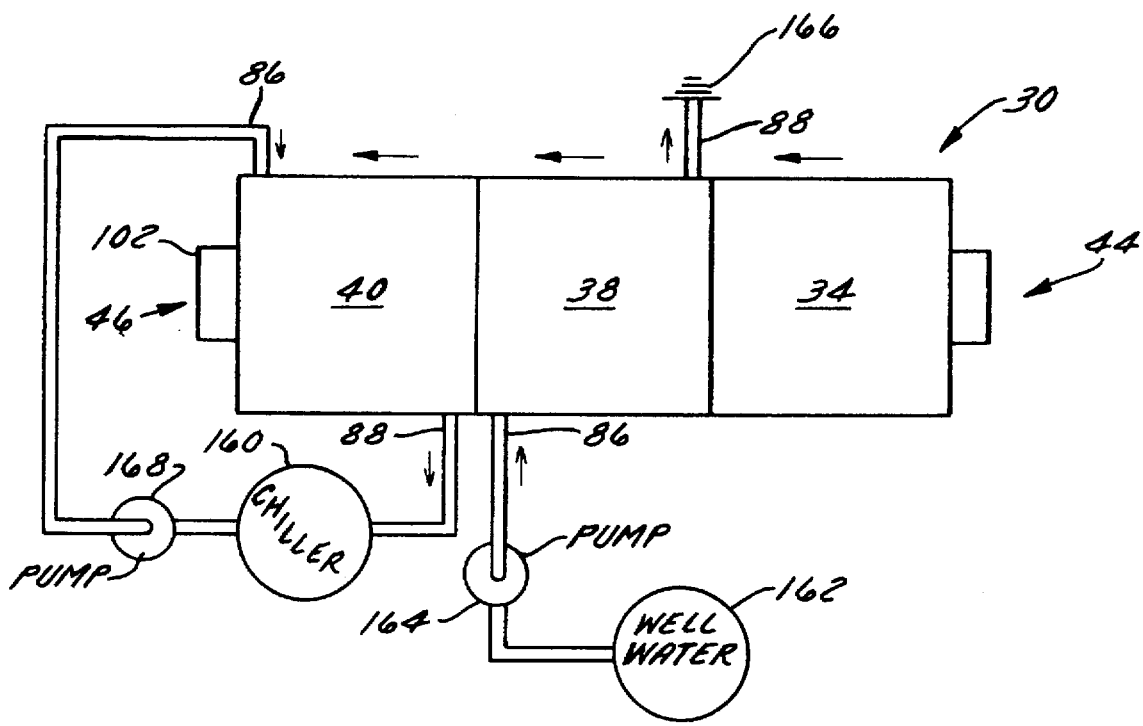
FIG. 5 is a piping diagram of a first preferred embodiment of the blanching and cooling apparatus of this invention showing a preferred source of cooling liquid and routing of the cooling liquid to the cooling tank compartments of the apparatus.

Referring to FIG. 5, well water or ground water 162 is urged by a pump 164 through the cooling water inlet 86 of the middle tank compartment 38 and into the middle tank compartment 38 to supply cool water to cool food product 36 in the middle drum segment 112. Preferably, well water or ground water 162 provided to the middle tank compartment 38 has a sufficiently low temperature to maintain the water within the tank compartment 38 at a temperature of between about 55° Fahrenheit and about 75° Fahrenheit. After the water has passed through the middle tank compartment 38, it can be disposed of such as by communicating it through the cooling water outlet 88 to a drain 166 or the like. However, if desired, the water exhausted from the middle tank compartment 38 can form at least part of the make-up water that is cooled by the chiller 160. As a result of using ground water 162 or well water 162 to cool the cooked or blanched food product 36, the need to refrigerate cooling water is significantly reduced saving energy and money.

Refrigerated or cooled water from the chiller 160 is pumped by a pump 168 through inlet 86 and into the discharge end tank compartment 40 to supply water at the desired temperature or within a desired temperature range to the discharge end drum segment 114 to further cool food product 36 in the drum segment 114. Preferably, the water introduced into the discharge end tank compartment 40 is cold enough to maintain the temperature of water within the compartment 40 between about 55° Fahrenheit and about 32° Fahrenheit. Water exhausted out the outlet 88 of the discharge end tank compartment 40 preferably is returned to the chiller 160 to be recooled and thereafter returned to the inlet 86 of the tank compartment 40. If desired, all or a portion of the exhausted cooling water can be directed to a drain or the like if the cooling water is to be disposed after use.

Preferably, the flow rate of cooling water introduced into the middle tank compartment 38 is approximately about double the flow rate of the cooling water introduced into the discharge end tank compartment 40. Actual flow rates will be depend upon factors such as: the type of food product processed, the heating operation performed on the food product before it is cooled, the temperature and volume of heated food product processed, the size and length of the tank compartments and drum segments, as well as perhaps other factors. Routine experimentation and testing can be done to determine optimum flow rates for each tank compartment depending on at least the aforementioned factors.

Figure 6:
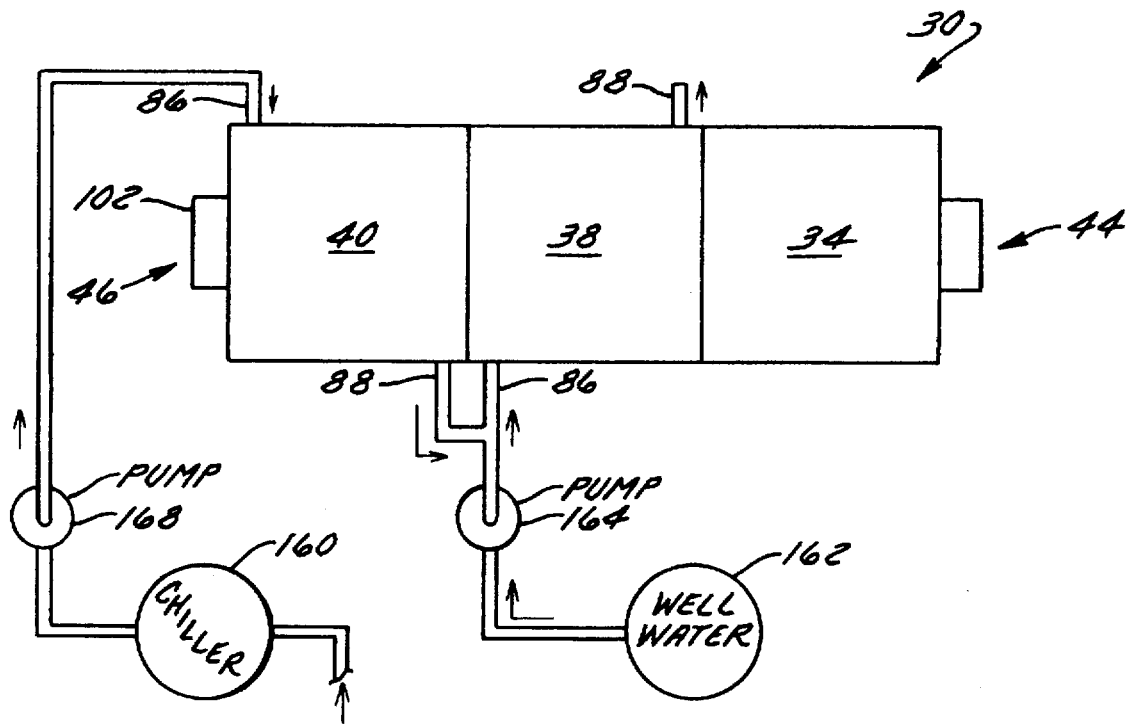
FIG. 6 is a piping diagram of a second preferred embodiment of the apparatus showing another preferred routing of the cooling liquid to the cooling tank compartments.

FIG. 6 illustrates another preferred cooling liquid source and piping arrangement. The chiller 160 supplies cold water to the discharge end tank compartment 40 and water exhausted from the discharge end tank compartment 40 makes up at least a portion of the water introduced into the middle tank compartment 38. To supplement the water from the discharge end tank compartment 40, well or ground water 162 is also pumped into the middle tank compartment 38. Preferably, at least some of the water discharged from the middle tank compartment 38 is returned to the chiller 160 for recooling and reuse.

Figure 7:
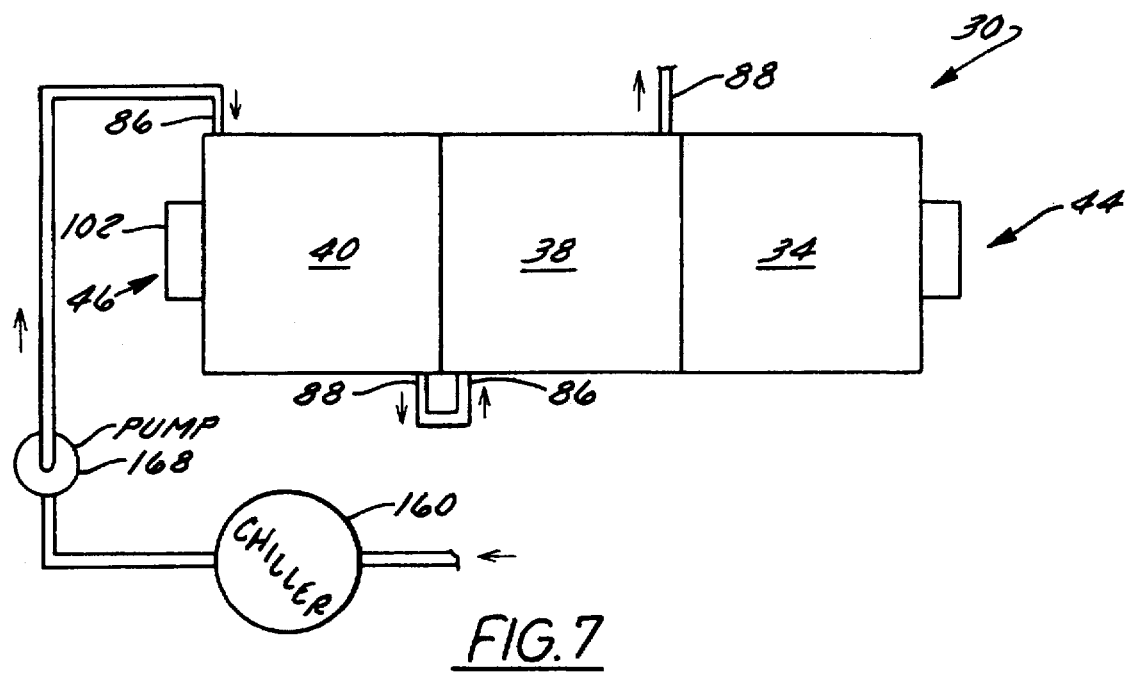
FIG. 7 is a piping diagram of a third preferred embodiment of the apparatus depicting a still further preferred routing and source of cooling liquid.

FIG. 7 illustrates still another preferred cooling liquid source and piping arrangement. In this preferred arrangement, chiller water introduced into the discharge end tank compartment 40 is exhausted from the tank compartment 40 into the middle tank compartment 38. At least some of the water discharged from the middle tank compartment 38 preferably is returned to the chiller 160 for recooling and reuse.

Figure 8:
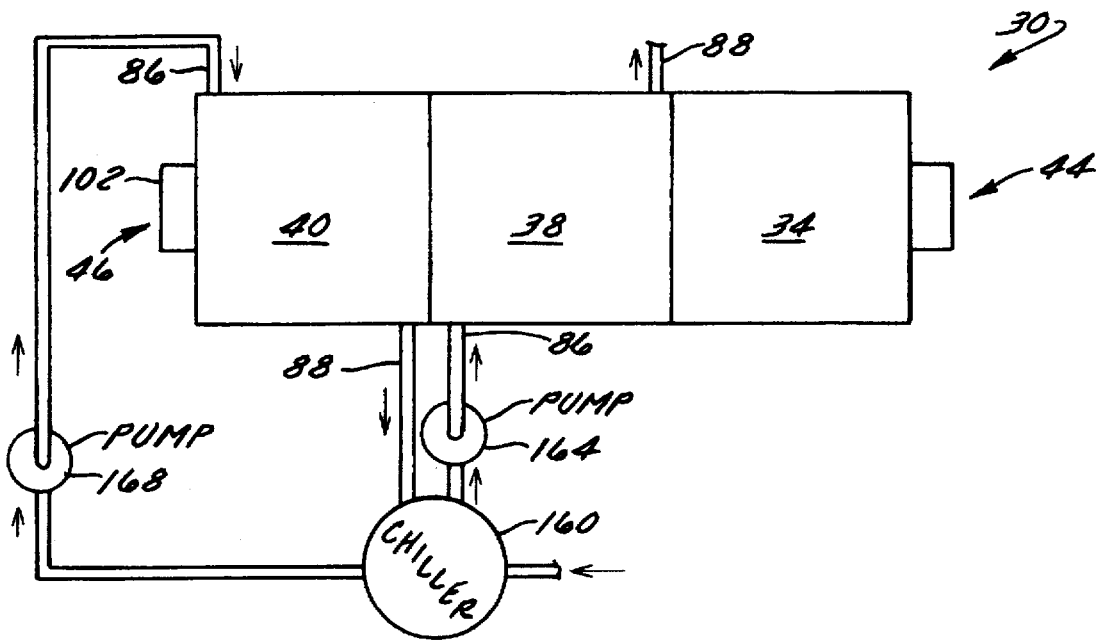
FIG. 8 is a piping diagram of a fourth preferred embodiment of the apparatus showing a cooling liquid source and another preferred cooling liquid routing arrangement.

FIG. 8 illustrates a still further preferred cooling liquid source and piping arrangement. In this preferred arrangement, chiller water is directly introduced from a chiller 160 to both the discharge end tank compartment 40 and the middle tank compartment 38. At least some of the water discharged from each tank compartment 38 & 40 preferably is returned to the chiller 160 for recooling and reuse.

Although a single chiller 160 is shown in FIG. 8, two or more chillers can be used to produce cooled, cold or chilled water. For example, a single chiller 160 can be used to supply cold or chilled water to the discharge end tank compartment 40 and a different chiller can be used to supply cooled or cold water to the middle tank compartment 38. These can be substantially closed systems, continuously recirculating the water through a chiller, into the tank compartment and back into the chiller. Some makeup water can be introduced to one or both chillers or tank compartments as is needed.

V. Use and Operation

A. Use

In use, the food processing apparatus 30 of this invention is used to process fruits, vegetables and other food products such as pasta, spaghetti, ravioli, tomato sauce, juices, and the like. A few examples of food products that are typically processed by such an apparatus 30 include corn, beans, peas, carrots, asparagus, onions, cabbage, tomato sauces, potatoes, french fries and other potato products. The food processing apparatus 30 of this invention is well suited for processing food product that is in pouches and is also well suited for processing food product that can be directly introduced into the apparatus 30 without being in any pouch. Preferably, processing of food product using the apparatus 30 of this invention includes first heating the food product 36, precooling the food product 36 after heating, and further cooling the food product 36 after it has been precooled.

B. Operation

In operation, food product 36 is introduced into the food processing apparatus 30 through an inlet opening in the inlet end plate 96 of the inlet end drum segment 110. Upon entry into the inlet end drum segment 110, the food product is received into a bath of hot liquid that preferably is hot water inside the inlet end tank compartment 34 and drum segment 110. To urge the food product 36 toward the next drum segment 112, the auger portion 130 of the inlet end drum segment 110 is rotated. Preferably, the length of the drum segment 110, diameter of the drum segment 110, size of the tank compartment 34, depth of water in the tank compartment 34, depth of food product 36 in the drum segment 110, and rotational speed of the auger portion 130 are all selected to impart the appropriate residency time to the food product 36 within the drum segment to properly process the food product 36 before it moves to the next drum segment 112. Preferably, the food product 36 is cooked or blanched before it is transferred to the next drum segment 112.

After the food product 112 has been suitably cooked or blanched, the food product transfer assembly 150 of the inlet end drum segment 110 transfers the food product 36 into the next drum segment 112. Preferably, it transfers the food product 36 into the middle drum segment 112 where the food product 36 is at least somewhat cooled. While in the middle drum segment 112, the food product 36 preferably is substantially immersed in the cooling water bath 80 in the middle tank compartment 38. Preferably, the length of the drum segment 112, diameter of the drum segment 112, size of the tank compartment 38, depth of water 80 in the tank compartment 38, depth of food product 36 in the drum segment 112, and rotational speed of auger portion 132 are all selected to impart the appropriate residency time to the food product 36 within the drum segment 112 to properly and relatively gradually cool the food product 36 a sufficient amount before it moves on to the next drum segment 114.

After the food product 36 has been precooled, the food product transfer assembly 150 of drum segment 112 transfers the food product 36 to the next drum segment 114. Preferably, it transfers the food product 36 to the discharge end drum segment 114 where the food product 36 is further cooled. While in the drum segment 114, the food product 36 preferably is substantially immersed in the cold water bath 82 in the discharge end tank compartment 40 to further cool the food product 36. Preferably, the length of the drum segment 114, diameter of the drum segment 114, size of the tank compartment 40, depth of water 82 in the tank compartment 40, depth of food product 36 in the drum segment 114, and rotational speed of auger portion 134 are all selected to impart the appropriate residency time to the food product 36 within the drum segment 114 to properly and relatively gradually cool the food product 36 a sufficient amount before it is discharged from the apparatus 30.

It is also to be understood that, although the foregoing description and drawings describe and illustrate in detail one or more embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

What is claimed is:

1. A food processing apparatus for heating and cooling food product comprising:

(a) a tank for receiving food product therein and having an inlet end and a discharge end;

(b) at least two dividing baffles received in the tank for dividing the tank into at least three tank compartments;

(c) a hot liquid received in at least one of the tank compartments;

(d) a cooling liquid received in at least two of the remaining tank compartments, with the cooling liquid having a temperature colder than the hot liquid; and (e) a food transport mechanism received in the tank for urging food product received in the tank toward the discharge end.

2. The food processing apparatus of claim 1 wherein one of the cooling tank compartments has a cooling liquid received therein that is colder in temperature than the cooling liquid received in another of the cooling tank compartments.

3. The food processing apparatus of claim 2 wherein one of the cooling tank compartments has a cooling liquid at a temperature of between about 33° Fahrenheit and about 35° Fahrenheit and another of the cooling tank compartments has a cooling liquid at a temperature of between about 55° Fahrenheit and about 75° Fahrenheit.

4. The food processing apparatus of claim 3 wherein hot liquid is received in a heating tank compartment is at a temperature of between about 160° Fahrenheit and about 210° Fahrenheit.

5. The food processing apparatus of claim 4 wherein the cooling liquid received in the cooling tank compartments is water.

6. The food processing apparatus of claim 5 further comprising a source of water for providing cooling water to one of the cooling tank compartments wherein the water source is well water or ground water.

7. The food processing apparatus of claim 6 wherein the source of well water or ground water provides at least some water to one of the cooling tank compartments so that the water in the cooling tank compartment has a temperature of between about 55° Fahrenheit and about 75° Fahrenheit.

8. The food processing apparatus of claim 4 wherein the hot liquid received in a heating tank compartment is water.

9. The food processing apparatus of claim 2 wherein the tank and each dividing baffle are constructed and arranged to prevent mixing of liquid between adjacent tank compartments.

10. The food processing apparatus of claim 2 wherein the food transport mechanism is an auger received in the tank and is constructed and arranged to move food product received in the tank toward the discharge end of the tank.

11. The food processing apparatus of claim 10 wherein the auger has (1) a first portion received in one of the tank compartments, (2) a second portion received in one of the remaining tank compartments, (3) a third portion received in another of the remaining tank compartments, and further comprises (1) a first food product transfer assembly in operable communication with the first and second auger portions for transferring food product from one of the tank compartments to another of the tank compartments, and (2) a second food product transfer assembly in operable communication with the second and third auger portions for transferring food product from another of the tank compartments to a still further tank compartment.

12. The food processing apparatus of claim 11 wherein one of the auger portions can be rotated independently of the other of the auger portions.

13. The food processing apparatus of claim 11 further comprising a drum received in the tank and substantially enclosing the auger with the drum having at least one through opening for allowing liquid inside the tank to enter the drum and the drum having (1) an inlet opening adjacent the tank inlet for allowing entry of food product into the drum and (2) an outlet opening adjacent the tank outlet for allowing the exit of food product from the drum.

14. The food processing apparatus of claim 13 wherein the drum comprises a generally cylindrical sidewall substantially enclosing the auger that is perforate for allowing liquid inside the tank to enter the drum.

15. The food processing apparatus of claim 14 wherein the auger is of coreless construction.

16. The food processing apparatus of claim 14 further comprising a generally cylindrical and elongate core supporting the auger.

17. The food processing apparatus of claim 1 wherein (1) the tank has (i) a tank compartment adjacent the inlet end of the tank, (ii) a tank compartment most adjacent the discharge end of the tank, and (iii) a tank compartment in the middle between the inlet end tank compartment and the tank compartment most adjacent the discharge end, and wherein (2) hot liquid is received in the inlet end tank compartment to blanch or cook food product received in the inlet end tank compartment, (3) a cooling liquid having a temperature colder than the hot liquid is received in the middle tank compartment for precooling food product after it has been blanched or cooked, and (4) a cooling liquid having a temperature colder than the temperature of the cooling liquid in the middle tank compartment is received in the tank compartment most adjacent the discharge end of the tank for further cooling food product after it has been precooled.

18. The food processing apparatus of claim 17 further comprising a perforate drum substantially enclosing the food transport mechanism and wherein (1) the food transport mechanism comprises a rotatable auger received in the drum and rotatably received in the tank and (2) the tank has no more than three tank compartments.

19. The food processing apparatus of claim 2 wherein the tank has exactly two dividing baffles and exactly three tank compartments.

20. The food processing apparatus of claim 19 wherein (1) the tank has (i) a tank compartment adjacent the inlet end of the tank, (ii) a tank compartment adjacent the discharge end of the tank, and (iii) a tank compartment in the middle between the inlet end tank compartment and the discharge end tank compartment, and (2) hot liquid is received in the inlet end tank compartment to blanch or cook food product received in the inlet end tank compartment, (3) a cooling liquid having a temperature colder than the hot liquid is received in the middle tank compartment for precooling food product after it has been blanched or cooked, and (4) a cooling liquid having a temperature colder than the temperature of the cooling liquid in the middle tank compartment is received in the discharge end tank compartment for further cooling food product after it has been precooled.

21. The food processing apparatus of claim 20 further comprising a source of cooling liquid that is well or ground water and wherein well or ground water is communicated to one of the middle and discharge end tank compartments.

22. The food processing apparatus of claim 21 wherein well water or ground water is communicated only to the middle tank compartment for precooling food product received in the middle tank compartment.

23. The food processing apparatus of claim 22 further comprising a source of cooling liquid that is refrigerated water communicated to at least one of the middle and discharge end tank compartments.

24. The food processing apparatus of claim 23 wherein all of the cooling liquid received in the discharge end tank compartment is refrigerated water and at least some of the liquid received in the middle tank compartment is ultimately refrigerated water.

25. The food processing apparatus of claim 24 wherein refrigerated water from the discharge end tank compartment is communicated to the middle tank compartment.

26. The food processing apparatus of claim 23 wherein the water in the middle tank compartment has a temperature of between about 55° Fahrenheit and about 75° Fahrenheit for precooling food product received in the middle tank compartment, and the water in the discharge end tank compartment has a temperature of between about 32° Fahrenheit and about 55° Fahrenheit for further cooling food product received in the discharge end tank compartment.

27. The food processing apparatus of claim 26 wherein the hot liquid received in the inlet end tank compartment is water having a temperature of between about 160° Fahrenheit and about 212° Fahrenheit.

28. The food processing apparatus of claim 20 wherein the source of cooling liquid for both the middle tank compartment and discharge end tank compartment is refrigerated water.

29. The food processing apparatus of claim 28 wherein refrigerated water from the discharge end tank compartment is communicated to the middle tank compartment to precool food product in the middle tank compartment.

30. The food processing apparatus of claim 29 further comprising a source of cooling liquid that is ground water or well water and wherein ground water or well water is communicated to the middle tank compartment to help precool food product.

31. The food processing apparatus of claim 20 wherein (1) one of the dividing baffles is located generally toward the inlet end between the inlet end tank compartment and middle tank compartment, (2) the other of the dividing baffles is located generally toward the discharge end between the middle tank compartment and the discharge end tank compartment, (3) the food transport mechanism is an auger rotatably received in the tank for urging food product received in the inlet end tank compartment generally toward the discharge end tank compartment, and further comprising (4)(i) a middle tank compartment coolant inlet adjacent the discharge end dividing baffle that is in fluid flow communication with the middle tank compartment for enabling cooling liquid to be introduced into the middle tank compartment, and (ii) a middle tank compartment coolant outlet adjacent the inlet end dividing baffle that is in fluid flow communication with the middle tank compartment for enabling cooling liquid in the middle tank compartment to be exhausted from the middle tank compartment wherein (iii) the middle tank compartment inlet and outlet are constructed and arranged such that flow of cooling liquid through the middle tank compartment is generally in a direction opposite the direction of food product movement through the middle tank compartment for producing a counterflow heat exchanging arrangement between the cooling liquid and food product within the middle tank compartment.

32. The food processing apparatus of claim 20 wherein (1) the tank has a discharge end wall adjacent the discharge end of the tank and an inlet end wall adjacent the inlet end of the tank, (2) one of the dividing baffles is located generally adjacent the inlet end between the inlet end tank compartment and middle tank compartment, (3) the other of the dividing baffles is located generally adjacent the discharge end between the middle tank compartment and the discharge end tank compartment, (4) the food transport mechanism is an auger rotatably received in the tank for urging food product received in the inlet end tank compartment toward the discharge end tank compartment, and further comprising (5)(i) a discharge end tank compartment piping inlet connection generally adjacent the discharge end tank wall that is in fluid flow communication with the discharge end tank compartment for enabling cooling liquid to be introduced into the discharge end tank compartment, and (ii) a discharge end tank compartment piping outlet connection adjacent the discharge end dividing baffle that is in fluid flow communication with the discharge end tank compartment for enabling cooling liquid in the discharge end tank compartment to be exhausted from the discharge end tank compartment wherein (iii) the discharge end tank compartment piping connections are constructed and arranged such that flow of cooling liquid through the discharge end tank compartment is generally in a direction opposite the direction of food product movement through the discharge end tank compartment for producing a counterflow heat exchanging arrangement within the discharge end tank compartment.

33. A food processing apparatus comprising:
 (a) a tank having an inlet end and a discharge end;
 (b) a first baffle which divides the tank into a heated compartment and a cooled compartment;
 (c) a second baffle which divides the cooled compartment into a first cooled compartment and a second cooled compartment;
 (d) a perforated drum mounted rotatably within the tank so that water contained in the tank will enter the cylinder, the cylinder having (1) an inlet opening near the inlet end of the tank for receiving food product and (2) a discharge opening near the discharge end of the tank where food product that has moved through the drum can be discharged from the drum, wherein the drum is divided into (1) a first segment which is received in the heated compartment of the tank, (2) a second segment which is received in the first cooled compartment of the tank, and (3) a third segment which is received in the second cooled compartment of the tank;
 (e) an auger positioned substantially within the perforated drum to rotate with the drum, the auger having portions with flights which define a generally helical food product urging surface, wherein a portion of the auger extends axially within the first segment of the drum, a portion of the auger extends axially within the second segment of the drum, and a portion of the auger extends axially within a third portion of the drum;
 (f) a first chute which extends between the heated compartment and the first cooled compartment of the tank;
 (g) a second chute which extends between the first cooled compartment and second cooled compartment of the tank;
 (h) at least one lifting flight located within the drum first segment and rotatable with the first segment to elevate food product from within the heated compartment to deposit the food product in the first chute to be discharged into the first cooled compartment of the tank, at least one lifting flight located in the drum second segment and rotatable with the second segment to elevate food product from within the first cooled compartment to deposit the food product on the second chute to be discharged into the second cooled compartment of the tank, and wherein food product introduced at the tank inlet will traverse the tank and be subjected to heating, a first stage of cooling and a second stage of cooling;
 (i) water having a temperature of between about 55° Fahrenheit and about 75° Fahrenheit received in the first cooled tank compartment to cool food product in the second drum segment; and (j) water having a temperature of between about 32° Fahrenheit and about 55° Fahrenheit received in the second cooled tank compartment to further cool food product received in the third drum segment.

34. The food processing apparatus of claim 33 wherein water having a temperature of between about 160° and about 212° Fahrenheit is received in the heated tank compartment.

35. The food processing apparatus of claim 34 wherein water in the second cooled tank compartment is at a temperature of between about 33° Fahrenheit and about 35° Fahrenheit.

36. The food processing apparatus of claim 33 wherein at least a portion of water in the first cooled tank compartment is well water or ground water.

37. The food processing apparatus of claim 33 further comprising a source of water in communication with the first cooled tank compartment that is well water or ground water having a temperature of between about 55° and about 75°.

38. The food processing apparatus of claim 33 further comprising (1) a heated water manifold disposed within the heated tank compartment, (2) a cooled water manifold disposed within the first cooled tank compartment, and (3) a cooled water manifold disposed within the second cooled tank manifold.

39. The food processing apparatus of claim 33 wherein at least two of the drum segments are constructed and arranged to rotate relative to each other.

40. The food processing apparatus of claim 33 wherein (1) the first cooled tank compartment has a water inlet and a water outlet, (2) the second cooled tank compartment has a water inlet and a water outlet, and (3) the water outlet of the second cooled tank compartment is in fluid flow communication with the water inlet of the first tank compartment for supplying at least a portion of the cooled water received in the first tank compartment.

41. The food processing apparatus of claim 40 further comprising a source of well water or ground water in communication with the water inlet of the first cooled tank compartment for supplying at least a portion of the cooled water received in the first tank compartment.

42. The food processing apparatus of claim 33 further comprising a source of refrigerated chilled water and wherein (1) the first cooled tank compartment has a water inlet and a water outlet, (2) the second cooled tank compartment has a water inlet and a water outlet, and (3) the source of chilled water is in fluid flow communication with the water inlet of the second cooled tank compartment for supplying water to the second cooled tank compartment.

43. The food processing apparatus of claim 42 further comprising a source of well water or ground water in fluid flow communication with the water inlet of the first cooled tank compartment.

44. The food processing apparatus of claim 33 wherein (1) the tank has an inlet end wall and a discharge end wall, (2) the first cooled compartment has a water inlet adjacent the first baffle and a water outlet adjacent the second baffle for creating a flow of cooled water within the second drum segment in a direction opposite the direction of movement of food product in the second drum segment to create a counterflow heat exchanger arrangement to cool food product in the second drum segment.

45. The food processing unit of claim 44 further comprising a source of well water or ground water in fluid flow communication with the water inlet of the first cooled tank compartment for supplying at least a portion of the cooled water received in the first cooled tank compartment.

46. The food processing apparatus of claim 33 wherein (1) the tank has an inlet end wall and a discharge end wall, (2) the second cooled compartment has a water inlet adjacent the second baffle and a water outlet adjacent the tank discharge end wall for creating a flow of cooled water within the second drum segment in a direction opposite the direction of movement of food product within the third drum segment to create a counterflow heat exchanger arrangement to cool food product in the third drum segment.

47. A food processing apparatus comprising:

(a) a tank having (1) an inlet end, (2) a discharge end, (3) a heating tank compartment for heating food product, (4) a precooling tank compartment for precooling food product, and (5) a cooling tank compartment for further cooling food product;

(b) an auger rotatably received in the tank and having a portion received in each of the tank compartments for urging food product generally toward the discharge end;

(c) water having a temperature of between about 55° Fahrenheit and about 75° Fahrenheit received in the precooling tank compartment to lower the temperature of food product that comes into contact with water in the precooling tank compartment; and (d) water having a temperature of between about 32° Fahrenheit and about 55° Fahrenheit received in the cooling tank compartment to further lower the temperature of food product that comes into contact with water in the cooling tank compartment.

48. The food processing apparatus of claim 47 further comprising water received in the heating tank compartment having a temperature of between about 160° Fahrenheit and about 210° to cook or blanch food product that comes into contact with the water in the heating tank compartment.

49. The food processing apparatus of claim 47 wherein each auger portion comprises at least two spaced apart flights forming a generally helical food product urging surface that urges food product in a direction generally toward the discharge end of the tank when rotated.

50. The food processing apparatus 49 further comprising a generally cylindrical drum received in the tank with the drum having a drum segment substantially enclosing each auger portion.

51. The food processing apparatus of claim 49 wherein one of the auger portions can rotate relative to another of the auger portions.

52. The food processing apparatus of 50 wherein the drum is rotatably received in the tank and at least two of the drum segments are constructed and arranged to allow relative rotation between drum segments.

53. The food processing apparatus of claim 47 wherein the tank is constructed and arranged to have exactly three tank compartments.

54. The food processing apparatus of claim 47 wherein the tank is constructed and arranged to have at least one tank compartment for heating food product and at least two tank compartments for precooling or cooling food product.

* * * * *